Figure 1:
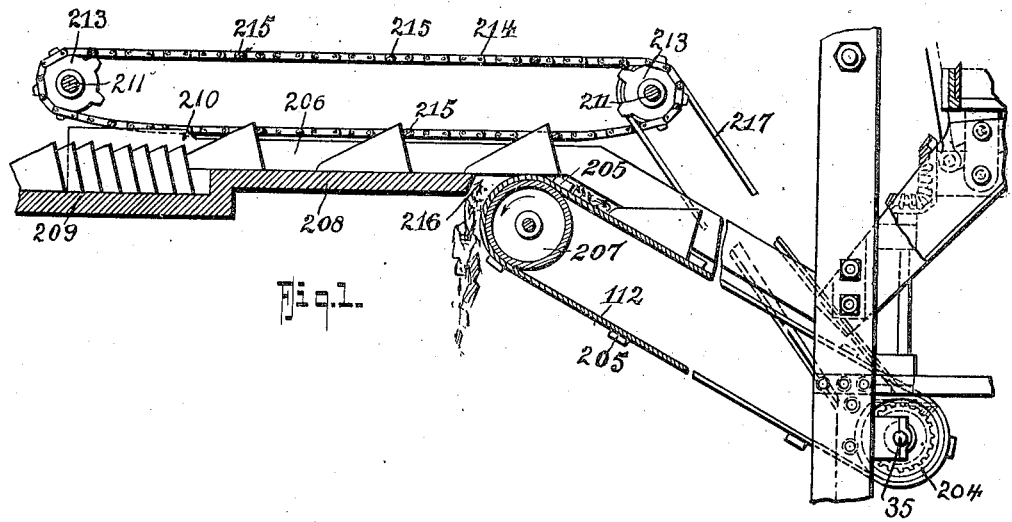

F. A. BRUCKMAN,
CONE NESTING AND STACKING MECHANISM.
APPLICATION FILED JAN. 24, 1913.

1,091,730.

Patented Mar. 31, 1914.

WITNESSES:
Robert M. Greenwell
John F. Schrott

INVENTOR
F. A. Bruckman
BY
Fred G. Dieterich Co.
ATTORNEYS

UNITED STATES PATENT OFFICE.

FREDERICK A. BRUCKMAN, OF PORTLAND, OREGON.

CONE NESTING AND STACKING MECHANISM.

1,091,730. Specification of Letters Patent. Patented Mar. 31, 1914.

Original application filed July 18, 1912, Serial No. 710,116. Divided and this application filed January 24, 1913. Serial No. 743,987.

*To all whom it may concern:*

Be it known that I, FREDERICK A. BRUCKMAN, residing at Portland, in the county of Multnomah and State of Oregon, have invented a new and useful Improvement in Cone Nesting and Stacking Mechanism, of which the following is a specification.

My present invention relates to automatic machines for molding, packing, trimming and stacking ice cream cones and the like, of the type generally disclosed in my copending applications, Serial #560568, filed May 11, 1910, and #710,116 filed July 18, 1912, of which later application the present one is a divisional part.

In the former of the two above mentioned applications is disclosed a machine, consisting of a rotatable wheel which turns on a vertical axis and carries a series of radially disposed female mold sections which turn with the wheel; core members are also provided for the mold sections. The mold sections and the cores, in their travel, pass a loading place, at which is located a loading device, by means of which a batter is supplied to the molding devices. After being loaded, the mold devices pass over baking burners, which bake the contents of the molding devices to the desired degree. After the molding devices have been carried around over the heaters a sufficient distance, they are automatically opened and the baked product is discharged from the same and passes through a trimming mechanism to a conveyer which removes the trimmed cores from the machine.

The present invention includes a mechanism for taking the cones as they are brought up by the conveyer on to which they are deposited when leaving the trimmer, and nesting the cones in sticks ready for packing.

The means for nesting the cones in sticks (the number of sticks depending on the number of cones each molding device is adapted to form at a single operation) comprises a nesting table divided by longitudinal partitions, between which partitions, the cones are carried by a nesting conveyer after they are brought up by the conveyer on to which they are deposited from the trimmer, to a depression in the table where the nested sticks of cones are formed by allowing the cones to drop bodily a short distance to a plane beneath the entrant part of the nesting table so that the point of the next nesting cone will freely enter the preceding one and as the succeeding cone is projected into the preceding one the nesting conveyer "lets go". The cones are thus nested in sticks as long as may be desired. Means are also provided in connection with the nesting mechanism for effecting a separation of the trimmings from the cones.

The present invention also resides in those novel details of construction, combination, and arrangement of parts, all of which will be first fully described and then be specifically pointed out in the appended claims, reference being had to the accompanying drawings, in which:—

Figure 2:
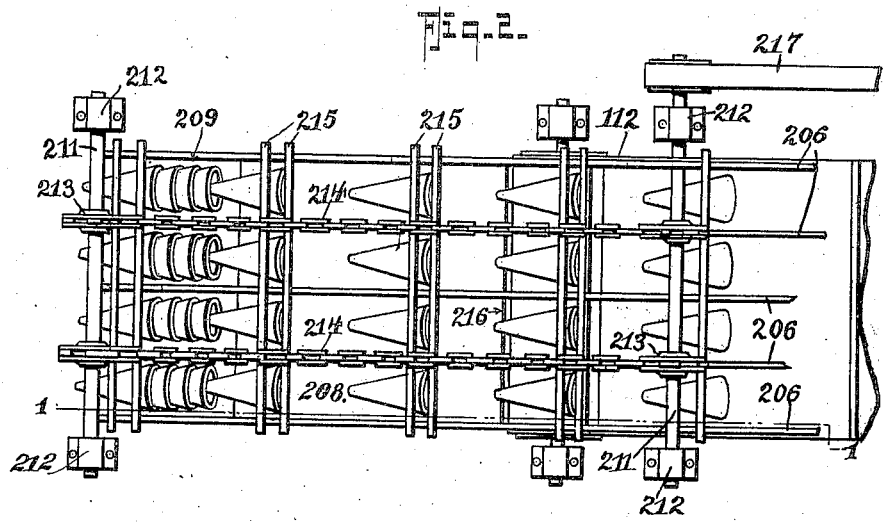

Figure 1 is a cross section on the line 1—1 of Fig. 2. Fig. 2 is a top plan view of the nesting table and nesting conveyer.

In the drawing, like numerals and letters of reference designate like parts in all the figures, and 35 designates the driving shaft for the elevating conveyer 112 onto which the cones are dropped from the trimming mechanism (not shown). The shaft 35 is mounted in suitable bearings in the frame of the machine and is driven from any suitable source of power.

The conveyer 112 has slats 205 and passes around the driving sprocket 204. The conveyer 112 also passes around an upper sprocket 207 and is separated into a number of longitudinal sections, depending on the number of cones formed by each mold device, through the medium of partitions 206 which extend up to the nesting table 208 and continue along the same as best indicated in Figs. 1 and 2 of the drawings.

The nesting table 208 is separated from the conveyer 112 at 216 a slight distance to allow the cuttings or chips to drop through while the cones pass from the conveyer 112 onto the table 208. The table 208 is provided with a depressed portion 209 so arranged that the point of the cones will deliver without catching into the mouth of the preceding cones as they are moved along the table 208 by the nesting conveyer 214. The nesting conveyer is mounted on sprockets 213, supported on shafts 211 mounted in any suitable bearings 212, and it is provided with a series of spaced transversed rods 215 which engage the cones and move them along the table 208 into the nesting depression 209. As the cones are delivered into one another in the depressed portion of the table, the upward incline 210 of the partitions 206 will be engaged by the rods 215, and the rods 215 will thereby be elevated to disengage the cones at that place. The conveyer 214 is driven by a chain or belt 217 which passes around a sprocket on the shaft 35.

From the foregoing description taken in connection with the accompanying drawing, it is thought the complete construction, operation and advantages of the invention will be apparent to those skilled in the art to which it appertains.

What I claim is:—

1. In a machine of the class described, a conveyer onto which the trimmings and trimmed cones are delivered, a nesting table onto which the cones are conveyed by said conveyer, a nesting conveyer mounted over said nesting table to engage said cones and move them into one another to nest the same, and said nesting table including means for disengaging said nesting conveyer from the cones when they have been nested.

2. In a machine of the character stated, a nesting table including a top having a stepped portion, a conveyer for carrying the cones to the table, and a conveyer for engaging and nesting the cones when they have been deposited on the table.

3. In a machine of the character stated, a nesting table including a top having a stepped portion, a nesting conveyer for moving the cones from the entrant toward the exit ends of the table to nest the same after the cones have been placed upon the table.

4. In a machine of the character stated, a table, and a conveyer for moving the cones along said table, means for directing the travel of said cones in procession, said table including means for holding nested cones in a position to receive the points of succeeding cones in the opening of the last nested cone.

5. In a machine of the character stated, a nesting table including a top having a stepped portion, a conveyer for carrying the cones and trimmings to the table, and means for engaging and nesting the cones when they have been deposited on the table.

6. In a machine of the character stated, a nesting table including a top having a stepped portion, a conveyer for carrying the cones and trimmings to the table, and means for engaging and nesting the cones when they have been deposited on the table, said first mentioned conveyer being spaced at its delivery point from the table to provide a discharge gap for the trimmings.

7. In a machine of the character stated, a nesting table including a top having a stepped portion, a conveyer for carrying the cones and trimmings to the table, and means for engaging and nesting the cones when they have been deposited on the table, said first mentioned conveyer being spaced at its delivery point from the table to provide a discharge gap for the trimmings, and longitudinal partitions separating said first conveyer and said table into a plurality of distinct cone-ways.

8. In an ice cream cone machine, the combination with the cone trimming mechanism into which the baked cones are deposited, of a cone and trimmings separating and cone stacking mechanism, comprising a stacking table with means for stacking the cones, and a conveyer for conveying the cones and trimmings toward the stacking table and depositing the cones on the stacking table while discharging the trimmings before they can arrive on the stacking table.

9. In an ice cream cone machine, a cone, and trimming, separating and cone stacking mechanism, comprising a stacking table, with means for stacking the cones, and a conveyer for conveying the cones and trimmings toward the stacking table and depositing the cones on the stacking table while discharging the trimmings before they can arrive on the stacking table.

FREDERICK A. BRUCKMAN.

Witnesses:
 O. S. Fulton,
 E. N. Haupert.